United States Patent [19]

Wei

[11] Patent Number: 5,418,798
[45] Date of Patent: May 23, 1995

[54] MULTIDIMENSIONAL TRELLIS-CODED COMMUNICATION SYSTEM

[75] Inventor: Lee-Fang Wei, Lincroft, N.J.

[73] Assignee: AT&T Corp., Murray Hill, N.J.

[21] Appl. No.: 49,739

[22] Filed: Apr. 19, 1993

Related U.S. Application Data

[63] Continuation-in-part of Ser. No. 45,846, Apr. 9, 1993, abandoned.

[51] Int. Cl.$^6$ .......................... G06F 11/10; H04L 5/12
[52] U.S. Cl. ...................... 371/43; 375/265; 375/244
[58] Field of Search ...................... 371/43; 375/39, 94, 375/27

[56] References Cited

U.S. PATENT DOCUMENTS

| | | | |
|---|---|---|---|
| 4,713,817 | 12/1987 | Wei | 371/43 |
| 4,873,701 | 10/1989 | Tretter | 375/39 |
| 5,307,377 | 4/1994 | Chouly et al. | 375/39 |

OTHER PUBLICATIONS

Wei, "Rotationally Invariant Convolutional Channel Coding with Expanded Signal Space Parts I and II", IEEE vol. SAC-2 No. 5; Sep. 1984, pp. 659–686.

IEEE Trans. on Information Theory vol. IT-33, No. 4, Jul. 1987, Wei, pp. 483–501.

*Primary Examiner*—Roy N. Envall, Jr.
*Assistant Examiner*—Steven R. Garland
*Attorney, Agent, or Firm*—Gerard A. deBlasi

[57] ABSTRACT

A trellis-coded modulation system is provided in which the output of the trellis encoder is used to select a subset of a multidimensional QAM constellation. The selection process is performed such that a) the minimum square Euclidean distance between valid sequences of successive selected subsets is maximized, b) the resulting code is rotationally invariant, and c) the selected subset corresponding to a transition of the trellis encoder from a present state i to a different next state j is different from the selected subset that corresponds to a transition of the trellis encoder from a present state j to a next state i.

19 Claims, 6 Drawing Sheets

NEXT STATE $W1_{n+2}\ W2_{n+2}\ W3_{n+2}\ W4_{n+2}\ W5_{n+2}\ W6_{n+2}$

| | 0 1 2 3 | 4 5 6 7 | 8 9 10 11 | 12 13 14 15 | 32 33 34 35 | 36 37 38 39 | 40 41 42 43 | 44 45 46 47 |
|---|---|---|---|---|---|---|---|---|
| 0 2 4 6 | 0 2 4 6 / 13 15 9 11 | 1 3 5 7 / 12 14 8 10 | 8 10 12 14 / 5 7 1 3 | 9 11 13 15 / 4 6 0 2 | 15 12 3 0 / 2 1 14 13 | 14 13 2 1 / 3 0 15 12 | 7 4 11 8 / 10 9 6 5 | 6 5 10 9 / 11 8 7 4 |
| 8 10 12 14 | 9 11 13 15 / 4 6 0 2 | 8 10 12 14 / 5 7 1 3 | 1 3 5 7 / 12 14 8 10 | 0 2 4 6 / 13 15 9 11 | 6 5 10 9 / 11 8 7 4 | 7 4 11 8 / 10 9 6 5 | 14 13 2 1 / 3 0 15 12 | 15 12 3 0 / 2 1 14 13 |
| 16 18 20 22 | 2 0 6 4 / 15 13 11 9 | 3 1 7 5 / 14 12 10 8 | 10 8 14 12 / 7 5 3 1 | 11 9 15 13 / 6 4 2 0 | 12 15 0 3 / 1 2 13 14 | 13 14 1 2 / 0 3 12 15 | 4 7 8 11 / 9 10 5 6 | 5 6 9 10 / 8 11 4 7 |
| 24 26 28 30 | 11 9 15 13 / 6 4 2 0 | 10 8 14 12 / 7 5 3 1 | 3 1 7 5 / 14 12 10 8 | 2 0 6 4 / 15 13 11 9 | 5 6 9 10 / 8 11 4 7 | 4 7 8 11 / 9 10 5 6 | 13 14 1 2 / 0 3 12 15 | 12 15 0 3 / 1 2 13 14 |
| 32 34 36 38 | 1 3 5 7 / 12 14 8 10 | 0 2 4 6 / 13 15 9 11 | 9 11 13 15 / 4 6 0 2 | 8 10 12 14 / 5 7 1 3 | 14 13 2 1 / 3 0 15 12 | 15 12 3 0 / 2 1 14 13 | 6 5 10 9 / 11 8 7 4 | 7 4 11 8 / 10 9 6 5 |
| 40 42 44 46 | 8 10 12 14 / 5 7 1 3 | 9 11 13 15 / 4 6 0 2 | 0 2 4 6 / 13 15 9 11 | 1 3 5 7 / 12 14 8 10 | 7 4 11 8 / 10 9 6 5 | 6 5 10 9 / 11 8 7 4 | 15 12 3 0 / 2 1 14 13 | 14 13 2 1 / 3 0 15 12 |
| 48 50 52 54 | 3 1 7 5 / 14 12 10 8 | 2 0 6 4 / 15 13 11 9 | 11 9 15 13 / 6 4 2 0 | 10 8 14 12 / 7 5 3 1 | 13 14 1 2 / 0 3 12 15 | 12 15 0 3 / 1 2 13 14 | 5 6 9 10 / 8 11 4 7 | 4 7 8 11 / 9 10 5 6 |
| 56 58 60 62 | 10 8 14 12 / 7 5 3 1 | 11 9 15 13 / 6 4 2 0 | 2 0 6 4 / 15 13 11 9 | 3 1 7 5 / 14 12 10 8 | 4 7 8 11 / 9 10 5 6 | 5 6 9 10 / 8 11 4 7 | 12 15 0 3 / 1 2 13 14 | 13 14 1 2 / 0 3 12 15 |

PRESENT STATE
$W1_n\ W2_n\ W3_n\ W4_n\ W5_n\ W6_n$

FIG. 6

NEXT STATE $W1_{n+2} W2_{n+2} W3_{n+2} W4_{n+2} W5_{n+2} W6_{n+2}$

| | 16 17 18 19 20 21 22 23 | 24 25 26 27 28 29 30 31 | 48 49 50 51 52 53 54 55 | 56 57 58 59 60 61 62 63 |
|---|---|---|---|---|
| 1 3 5 7 | 16 18 20 22  17 19 21 23  29 31 25 27  28 30 24 26 | 24 26 28 30  25 27 29 31  21 23 17 19  20 22 16 18 | 31 28 19 16  30 29 18 17  18 17 30 29  19 16 31 28 | 23 20 27 24  22 21 26 25  26 25 22 21  27 24 23 20 |
| 9 11 13 15 | 25 27 29 31  24 26 28 30  20 22 16 18  21 23 17 19 | 17 19 21 23  16 18 20 22  28 30 24 26  29 31 25 27 | 22 21 26 25  23 20 27 24  27 24 23 20  26 25 22 21 | 30 29 18 17  31 28 19 16  19 16 31 28  18 17 30 29 |
| 17 19 21 23 | 18 16 22 20  19 17 23 21  31 29 27 25  30 28 26 24 | 26 24 30 28  27 25 31 29  23 21 19 17  22 20 18 16 | 28 31 16 19  29 30 17 18  17 18 29 30  16 19 28 31 | 20 23 24 27  21 22 25 26  25 26 21 22  24 27 20 23 |
| 25 27 29 31 | 27 25 31 29  26 24 30 28  22 20 18 16  23 21 19 17 | 19 17 23 21  18 16 22 20  30 28 26 24  31 29 27 25 | 21 22 25 26  20 23 24 27  24 27 20 23  25 26 21 22 | 29 30 17 18  28 31 16 19  16 19 28 31  17 18 29 30 |
| 33 35 37 39 | 17 19 21 23  16 18 20 22  28 30 24 26  29 31 25 27 | 25 27 29 31  24 26 28 30  20 22 16 18  21 23 17 19 | 30 29 18 17  31 28 19 16  19 16 31 28  18 17 30 29 | 22 21 26 25  23 20 27 24  27 24 23 20  26 25 22 21 |
| 41 43 45 47 | 24 26 28 30  25 27 29 31  21 23 17 19  20 22 16 18 | 16 18 20 22  17 19 21 23  29 31 25 27  28 30 24 26 | 23 20 27 24  22 21 26 25  26 25 22 21  27 24 23 20 | 31 28 19 16  30 29 18 17  18 17 30 29  19 16 31 28 |
| 49 51 53 55 | 19 17 23 21  18 16 22 20  30 28 26 24  31 29 27 25 | 27 25 31 29  26 24 30 28  22 20 18 16  23 21 19 17 | 29 30 17 18  28 31 16 19  16 19 28 31  17 18 29 30 | 21 22 25 26  20 23 24 27  24 27 20 23  25 26 21 22 |
| 57 59 61 63 | 26 24 30 28  27 25 31 29  23 21 19 17  22 20 18 16 | 18 16 22 20  19 17 23 21  31 29 27 25  30 28 26 24 | 20 23 24 27  21 22 25 26  25 26 21 22  24 27 20 23 | 28 31 16 19  29 30 17 18  17 18 29 30  16 19 28 31 |

PRESENT STATE  
$W1_n W2_n W3_n W4_n W5_n W6_n$

MULTIDIMENSIONAL TRELLIS-CODED COMMUNICATION SYSTEM

RELATED APPLICATIONS

This application is a continuation-in-pan of commonly owned, copending U.S. patent application Ser. No. 08/045,846, filed Apr. 9, 1993, entitled "Improved Multidimensional Trellis-Coded Communication System", now abandoned.

TECHNICAL FIELD

This invention relates to multidimensional trellis-coded modulation useful, for example, in voiceband data transmission (e.g., modem) applications.

BACKGROUND OF THE INVENTION

Various techniques have been used to improve the bandwidth efficiency and noise immunity of communication channels. One particularly useful technique is rotationally-invariant, multidimensional trellis-coded modulation. Such codes have been disclosed, for example, in U.S. Pat. No. 4,713,817, issued Dec. 15, 1987, entitled "Multidimensional, Convolutionally Coded Communication Systems." However, certain prior art codes had a defect in that the same sequence of signal points can be generated by the trellis encoder when the trellis encoder traverses two different paths of trellis states.

This defect in the prior art is not easily corrected, especially when the code must, at the same time, achieve rotational invariance and a large amount of coding gain.

SUMMARY OF THE INVENTION

The defect of the prior art is overcome, while maintaining rotational invariance and a large amount of coding gain, by providing a novel trellis code in which the trellis encoder is operated such that the selected subset corresponding to a transition of the trellis encoder from a present state i to a different next state j is different from the selected subset that corresponds to a transition of the trellis encoder from a present state j to a next state i.

BRIEF DESCRIPTION OF THE DRAWINGS

FIGS. 5 and 6 together are a state transition diagram that represents the trellis code embodied in the trellis encoder of FIG. 4.

DETAILED DESCRIPTION

Figure 1:
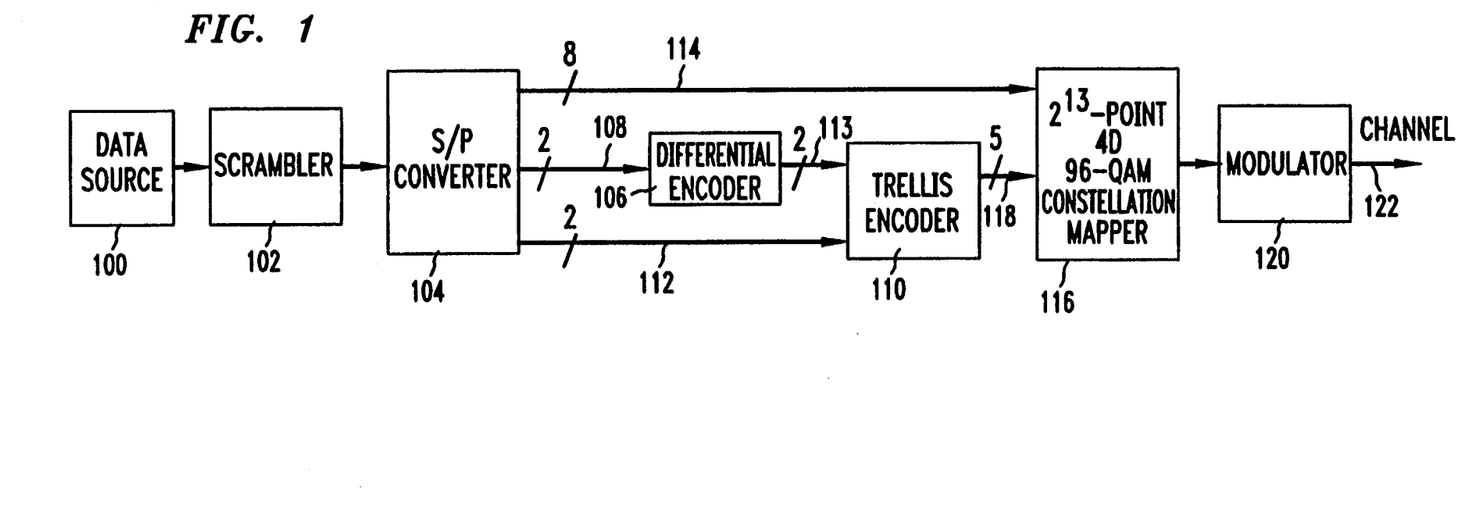
FIG. 1 is a block diagram of the transmitter portion of a communication system utilizing a trellis-coded modulation scheme embodying the principles of the invention.
Figure 2:
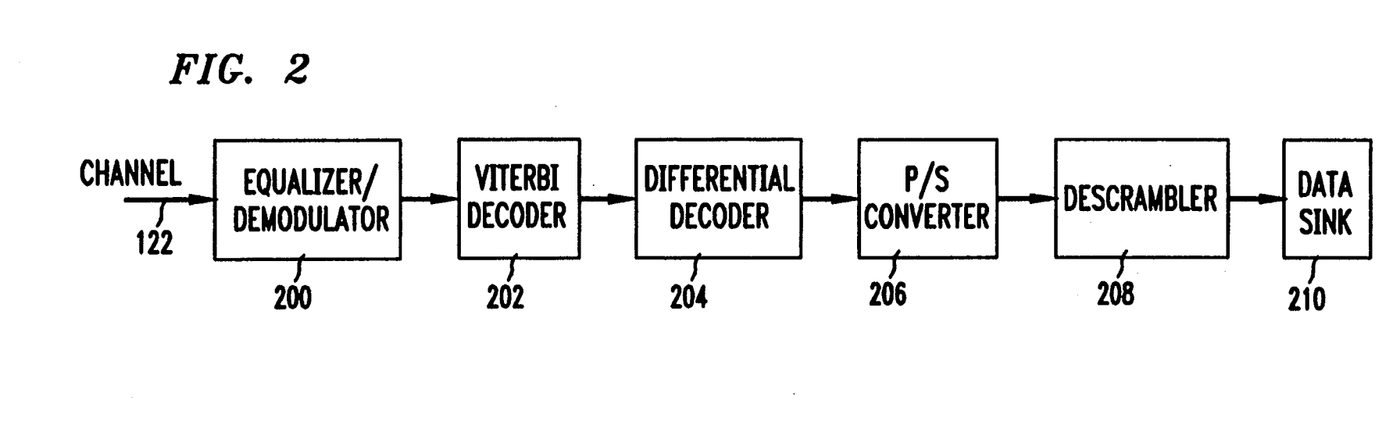
FIG. 2 is a block diagram of the receiver portion of a communication system capable of receiving and processing the signals generated by the transmitter of FIG. 1.

Referring now to the drawings, FIGS. 1 and 2 show the transmitter and receiver portions, respectively, of an exemplary communication system constructed for use with the present invention. In FIG. 1, a stream of bits from a data source 100, such as a computer terminal, is clocked into a scrambler 102, which randomizes the bits in a conventional manner. The serial bit stream output from scrambler 102 is provided to a serial-to-parallel converter 104, which outputs parallel words. Two bits from converter 104 are provided to a differential encoder 106, which illustratively is a Mod-4 differential encoder, via line 108. Two other bits from converter 104 are provided to a trellis encoder 110 via line 112. As described in greater detail below, trellis encoder 110 encodes the two bits from line 112, together with two bits received on line 113 from differential encoder 106, to output five bits (which may be referred to as the "trellis encoded bits") on line 118 to a $2^{13}$-point 4D 96-QAM constellation mapper 116.

Constellation mapper 116 provides channel signal points to a modulator 120 by selecting the signal points from a predetermined $2^{13}$-point 4D QAM signal constellation. In particular, constellation mapper 116 uses the five bits received from trellis encoder 110 to select a subset of the 4D QAM signal constellation, and uses an additional eight bits received from converter 104 on line 114 to select a 4D signal point from the selected subset. (The sequence formed by successive selected subsets is hereafter referred to as a "valid" sequence of subsets of the trellis code. Similarly, the sequence formed by successive selected signal points is hereafter referred to as a "valid" sequence of signal points of the trellis code. Generally, the performance of a trellis-coded system is determined by the minimum square Euclidian distance (MSED) between any two valid sequences of signal points of the code.) The selected 4D signal point is provided to conventional pulse-shaping filters (not shown) and then to modulator 120. Modulator 120 modulates the sequence of selected signal points onto a communication channel 122 for transmission to the receiver portion of the communication system.

Referring now to the receiver portion of the communication system, shown in FIG. 2, a signal received from communication channel 120 is processed in a conventional manner by equalizer/demodulator 200. Equalizer/demodulator 200 generates a sequence of channel-distorted signal points, which is then processed by a maximum-likelihood-type decoder (illustratively a Viterbi decoder or a reduced-complexity Viterbi decoder). The output bits of decoder 202 are provided to a differential decoder 204 for decoding in a conventional manner. Decoder 204 outputs bits to a parallel-to-serial converter 206, descrambled in a conventional manner by a descrambler 208, and received by a data sink 210 (which may be, for example, a mainframe computer).

Figure 3:
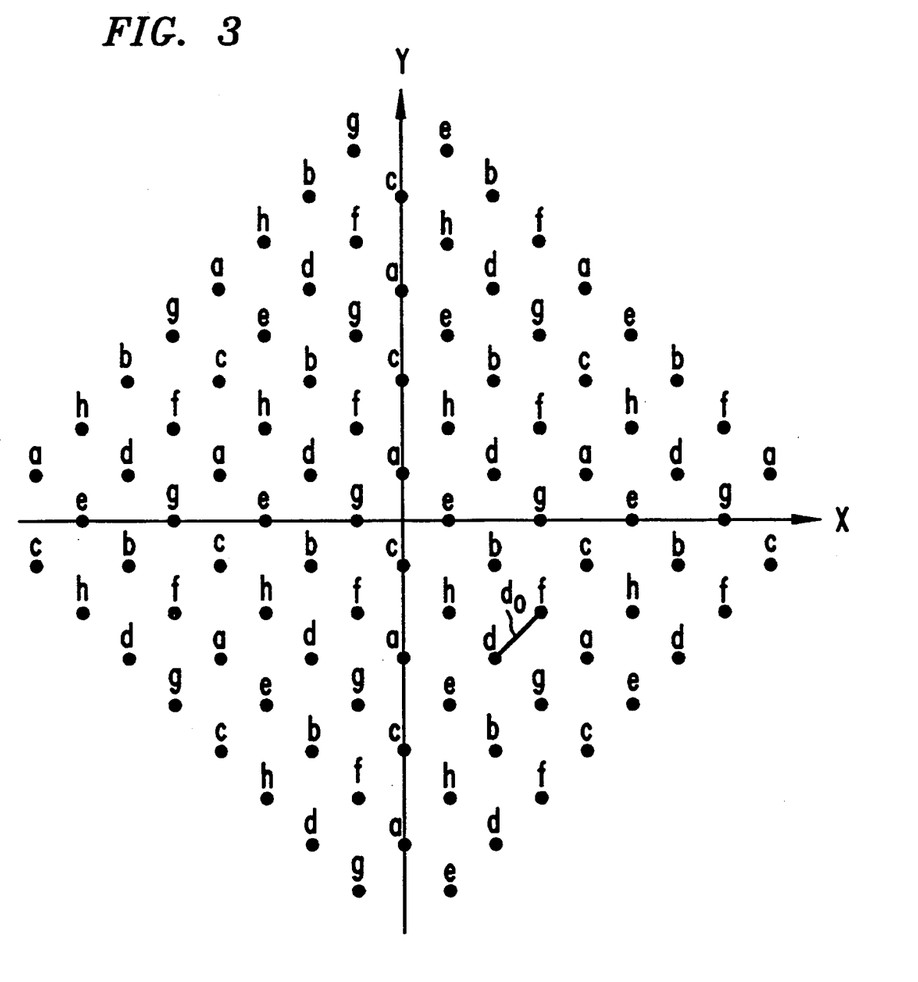
FIG. 3 shows a two-dimensional constellation that may be used in the transmitter of FIG. 1 either by itself or as a constituent of a higher-dimensional constellation.

FIG. 3 shows an exemplary 2-dimensional (2D) QAM constellation suitable for use with the present invention. The constellation has 96 symbols, which are partitioned into eight 2D subsets A through H. The MSED between any two symbols of the constellation is given by $d_0^2$. The constellation has four phase symmetries. That is, when a symbol of the constellation is rotated by 90, 180, or 270 degrees, that symbol becomes another symbol of the constellation. The MSED between any two symbols of a particular subset, A through H, is $8d_0^2$.

A $2^{13}$-point 4D 96-QAM constellation is formed by first concatenating a pair of 2D 96-QAM constellations and then deleting selected signal points, using the technique disclosed in my earlier U.S. Pat. No. 4,713,817, issued Dec. 15, 1987, entitled "Multidimensional, Convolutionally Coded Communication Systems" (the "Wei patent"), which is hereby incorporated by reference. The 4D constellation is then partitioned into 32 4D subsets, 0 to 31, as shown in FIG. 18 of the Wei patent. The 4D constellation also has four phase symmetries. Subsets 0 to 15 are grouped together to form a first 4D family of subsets, and subsets 16 to 31 are grouped together to form a second 4D family of subsets. The MSED between any two points of the 4D constellation is $d_0^2$. The MSED between any two points within each of the two families is $2d_0^2$. The MSED between any two points within each of the 32 4D subsets is $8d_0^2$.

Each of the families can be evenly divided into four groups wherein the four subsets within a group can be obtained from one another through 90 degree rotations. For example, the four groups in the first 4D family are {0,1,2,3}, {4,5,6,7}, {8,9,10,11 } and {12,13,14,15}. Thus, the 4D subsets 0, 1, 2, and 3, for example, belong to the same group because they can be obtained from each other through 90 degree rotations.

Using the 32-subset partitioning of the 4D constellation, a rotationally invariant 64 state, rate-4/5 trellis encoder was designed as shown in FIG. 19 of the Wei patent. (As used herein, a code is "rotationally invariant" when a valid sequence of signal points becomes another valid sequence of signal points after each signal point in the sequence is rotated by a given phase angle that corresponds to a phase symmetry of the constellation.) The trellis encoder will, in response to the four input bits received during each 4D signal interval, transition from a present state to a next state and generate five trellis-encoded output bits. These five trellis-encoded bits are used by constellation mapper 116 to select a subset of the 4D constellation. However, the trellis encoder of the Wei patent has the following defect: it is possible that the selected subset that corresponds to a transition of the trellis encoder from a present state i to a different next state j is identical to the selected subset that corresponds to a transition of the trellis encoder from a present state j to a next state i. For example, the selected subsets that correspond to transitions of the trellis encoder from a present state 2 to a next state 36 and from a present state 36 to a next state 2 are both 5. As a result of this property, for a given valid sequence of subsets (or signal points) there may exist another valid sequence that originates from the same initial state as the given sequence and whose square Euclidian distance from the given sequence is less than $5d_0^2$. For example, two such valid sequences of subsets that originate from an initial trellis state 0 are 2, 5, 5, 5, 5 ... and 0, 2, 5, 5, 5, ... The squared Euclidian distance between these two valid sequences of subsets is $4d_0^2$.

I have overcome this problem in the prior art by constructing a novel 64 state rate-4/5 trellis encoder based on the 32 subset partitioning of the 4D constellation described above. This code has both of the following properties: a) it is invariant to 90, 180, and 270 degree rotations of the constellation, and b) the selected subsets that correspond to the transitions of the trellis encoder from a present state i to a different next state j and from a present state j to a next state i are different. As a result of the latter property, it is possible to design the code such that the MSED between its valid sequences of subsets is $5d_0^2$. One such code is described below with reference to FIGS. 4–6.

Figure 4:
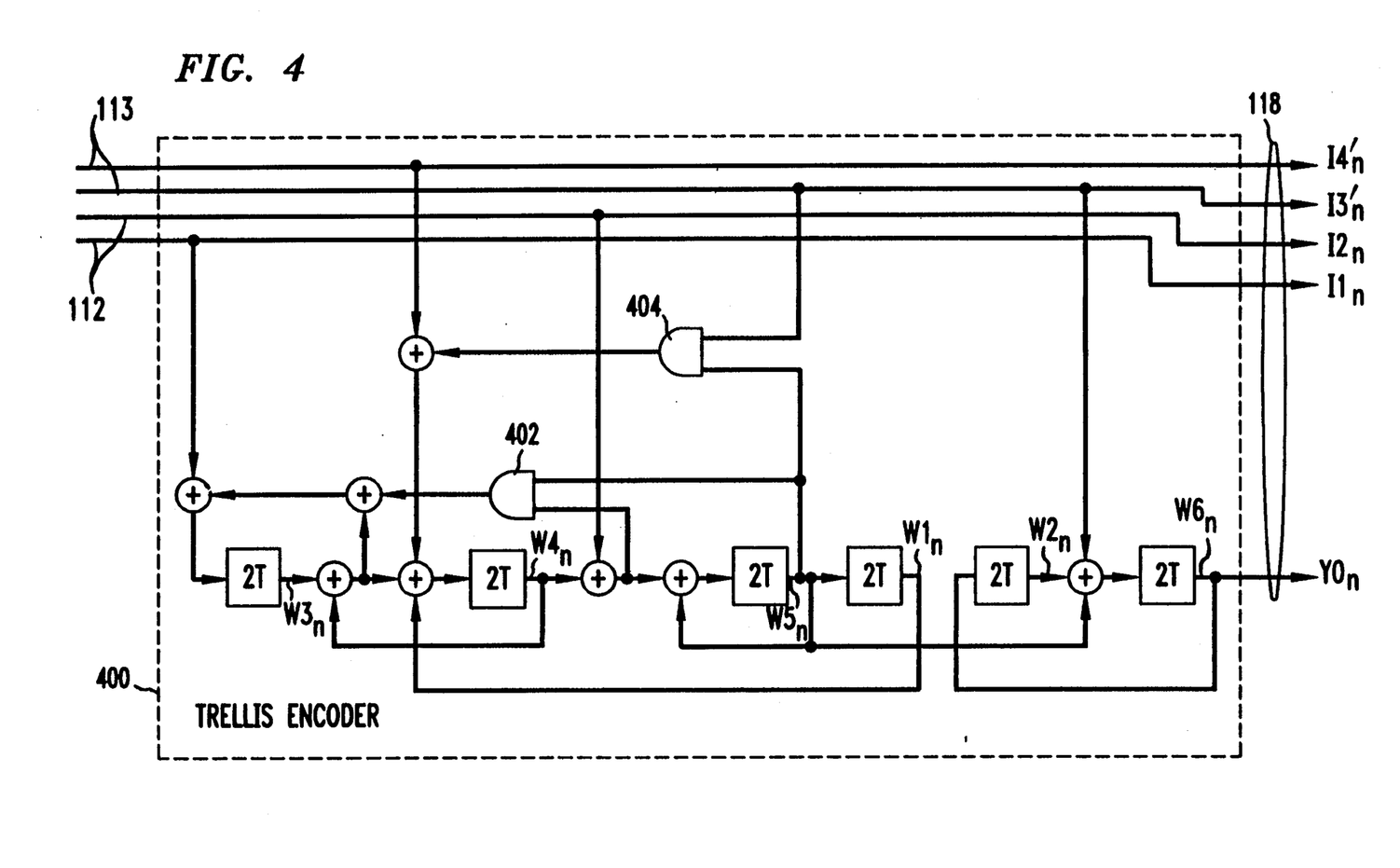
FIG. 4 is a schematic diagram of an exemplary embodiment of the trellis encoder of the transmitter of FIG. 1.

FIG. 4 shows a novel trellis encoder 400 constructed in accordance with the principles of the present invention. Trellis encoder 400 is a 64 state rate-4/5 encoder. Trellis encoder 400 includes six delay elements labeled 2T (where T represents the delay associated with a 2D signal interval), AND gates 402 and 404, and exclusive OR gates (which are represented by the symbol "+"). The bits that are stored in the six delay elements for the present 4D signaling interval are denoted as $W1_n$, $W2_n$ ..., $W6_n$, as shown in FIG. 4. The bits that are stored in the corresponding six delay elements for the next 4D signaling interval are denoted as $W1_{n+2}$, $W2_{n+2}$, ..., $W6_{n+2}$. The five bits that are output by trellis encoder 400 for the present 4D signaling interval are denoted as $YO_n$, $I1_n$, $I2_n$, $I3_n'$, $I4_n'$, as shown in FIG. 4.

FIGS. 5 and 6 each show a portion of a state transition diagram which represents the code embodied by trellis encoder 400. The vertical axis of each diagram indicates the present state of the trellis encoder and the horizontal axis of each diagram indicates the next state of the trellis encoder. In the diagram, the present state $W1_n W2_n W3_n W4_n W5_n W6_n$ and the next state $W1_{n+2} W2_{n+2} W3_{n+2} W4_{n+2} W5_{n+2} W6_{n+2}$ are represented by their decimal equivalents. If a state transition from a present state i to a next state j is allowed, then the corresponding entry in the state diagram is filled with a number. That number indicates the selected subset that corresponds to that state transition. The subset number is represented by the decimal equivalent of the encoder output bit pattern $YO_n I1_n I2_n I3_n' I4_n'$. For example, a transition from a present state 20 to a next state 9 is allowed, and the selected subset that corresponds to that state transition is 5 (see FIG. 5). If a state transition from a present state i to a next state j is not allowed, then the corresponding entry in the state diagram is left blank.

One skilled in the an will appreciate that the code embodied in trellis encoder 400 and in the state diagram of FIGS. 5 and 6 satisfies the desired properties discussed above. Namely, a) the code is invariant to 90, 180, and 270 degree rotations of the constellation, and b) the selected subsets that correspond to the transitions of each trellis encoder from a present state i to a different next state j and from a present state j to a next state i are different. One skilled in the an also will appreciate that the MSED between valid sequences of subsets or between valid sequences of signal points for this code is $5d_0^2$.

In a preferred embodiment of the invention, the states that can be occupied by trellis encoder 400 are divided into two categories. The first category consists of even-numbered states, and the second category consists of odd-numbered states. The 4D subsets that are associated with state transitions from an even-numbered present state belong to the first 4D family of subsets (described above). Similarly, the 4D subsets that are associated with state transitions from an odd-numbered present state belong to the second 4D family of subsets. From each present state there are sixteen allowed transitions. Half of these transitions lead to even-numbered next states, while the remaining transitions lead to odd-numbered next states.

Suppose that a 4D group is used for the state transitions from a certain present state. In accordance with one aspect of the invention, only two subsets of the 4D group are used for the state transitions from the present state to the even-numbered next states. The remaining two subsets of the group are used for the state transitions from the present state to the odd-numbered next states. For example, the 4D group that consists of subsets 0, 1, 2, and 3 is used for state transitions from present state 0. The 4D subsets 0 and 1 of this group are used for state transitions from present state 0 to next states 0 and 4, while the 4D subsets 2 and 3 of this group are used for state transitions from present state 0 to next states 1 and 5.

It will be apparent to one skilled in the art that other modifications can be made to the described embodiment without departing from the scope of the invention. For example, although I have disclosed one code constructed in accordance with the invention, in view of the present disclosure, other such codes could be readily constructed. Also, constellations of different sizes could be used, and a different number of input bits could be used for each 4D signaling interval. In still other embodiments, the 4D constellation could be formed using conventional constellation shaping techniques.

I claim:

1. A method for selecting a sequence of signal points from a 4-dimensional (4D) QAM constellation to represent a sequence of input bits, the constellation having four phase synmmetries, the method comprising the steps of:
   applying, during each 4D signaling interval, a first portion of the input bits to a rate-4/5 trellis encoder which transitions from a present state to a next state and generates trellis encoded bits;
   selecting, in response to the trellis encoded bits, one of a plurality of subsets of the 4D constellation;
   identifying, in response to a second portion of the input bits, a 4D signal point from the selected subset;
   generating an output signal representing a valid sequence of successive identified 4D signal points, and
   wherein a valid sequence of signal points becomes another valid sequence of signal points after a 90, 180, or 270 degree rotation;
   the plurality of subsets form first and second families of subsets, each family of subsets being evenly divided into a plurality of groups of subsets having four subsets in each group, the subsets within each group being obtainable from each other through 90 degree phase rotations;
   the trellis encoder occupies one of a plurality of states, the plurality of states being divided into first and second categories, and from each present state, half of the transitions will lead to next states in the first category and half of the transitions will lead to next states in the second category;
   the subsets that are associated with state transitions from present states in the first category belong to the first family and the subsets that are associated with state transitions from present states in the second category belong to the second family; and
   for each group of subsets that is associated with state transitions from a present state, two subsets of the group are associated with state transitions from a present state to next states in the first category and two subsets of the group are associated with state transitions from a present state to next states in the second category.

2. The invention of claim 1 further comprising the step of:
   differentially encoding, prior to trellis encoding, selected ones of the first portion of the input bits.

3. The invention of claim 1 wherein the rate-4/5 trellis encoder is a finite state machine having 64 states.

4. The invention of claim 1 wherein the rate-4/5 trellis encoder is invariant to 90, 180, and 270 degree rotations of the constellation.

5. A method for selecting a sequence of signal points from a 4-dimensional (4D) QAM constellation to represent a sequence of input bits, the constellation having four phase symmetries and a minimum square Euclidean distance (MSED) between its signal points of a first predetermined distance, the method comprising the steps of:
   applying, during each 4D signaling interval, a first portion of the input bits to a rate4/5 trellis encoder to generate a plurality of trellis encoded bits;
   selecting, in response to the trellis encoded bits, one of a plurality of subsets of the 4D QAM constellation;
   identifying, in response to second portion of the input bits, a 4D signal point from the selected subset; and
   generating an output signal representing a valid sequence of successive identified 4D signal points,
   the MSED between two valid sequences of signal points corresponding to any two different sequences of input bits is five times the first predetermined distance and a valid sequence of signal points becomes another valid sequence of signal points after a 90, 180, or 270 degree rotation.

6. The invention of claim 6 wherein:
   the plurality of subsets form first and second families of subsets, each family of subsets being evenly divided into a plurality of groups of subsets having four subsets in each group, the subsets within each group being obtainable from each other through 90 degree phase rotations;
   the trellis encoder which occupies one of a plurality of states and, during each 4D signaling interval, transitions from a present state to a next state, the plurality of states being divided into first and second categories, and from each present state, half of the transitions will lead to next states in the first category and half of the transitions will lead to next states in the second category;
   the subsets that are associated with state transitions from present states in the first category belong to the first family and the subsets that are associated with state transitions from present states in the second category belong to the second family; and
   for each group of subsets that is associated with state transitions from a present state, two subsets of the group are associated with state transitions from a present state to next states in the first category and two subsets of the group are associated with state transitions from a present state to next states in the second category.

7. The invention of claim 5 wherein the rate-4/5 trellis encoder is a finite state machine having 64 states.

8. The invention of claim 5 wherein the rate-4/5 trellis encoder is a finite state machine which, in response to input bits received in a 4D signaling interval, transitions from a present state to a next state and generates trellis encoded bits that are used to select a subset of the constellation, and
   the selected subset corresponding to a transition of the trellis encoder from a present state i to a different next state j is different from the selected subset that corresponds to a transition of the trellis encoder from a present state j to a next state i.

9. The invention of claim 5 further comprising the step of:

differentially encoding, prior to trellis encoding, pan of the first portion of the input bits.

10. The invention of claim 6 wherein the rate-4/5 trellis encoder is invariant to 90, 180, and 270 degree rotations of the constellation.

11. Transmitter apparatus comprising:

a rate-4/5 trellis encoder which, for each 4-dimensional (4D) signal interval, transitions from a present state to a next state and generates trellis encoded bits;

means for applying to the trellis encoder a first predetermined ones of a plurality of input bits received by the transmitter during a 4D signaling interval; and mapping means for providing channel signal points selected from a predetermined 4D QAM signal constellation in response to the output of the trellis encoder and a second predetermined ones of the input bits, wherein a valid sequence of successive channel signal points becomes another valid sequence of channel signal points after a 90, 180, or 270 degree rotation of the constellation;

the signal points are grouped into a plurality of subsets, the plurality of subsets forming first and second families of subsets, each family of subsets being evenly divided into a plurality of groups of subsets having four subsets in each group, the subsets within each group being obtainable from each other through 90 degree phase rotations;

the trellis encoder occupies one of a plurality of states, the plurality of states being divided into first and second categories, and from each present state, half of the transitions will lead to next states in the first category and half of the transitions will lead to next states in the second category;

the subsets that are associated with state transitions from present states in the first category belong to the first family and the subsets that are associated with state transitions from present states in the second category belong to the second family; and for each group of subsets that is associated with state transitions from a present state, two subsets of the group are associated with state transitions from a present state to next states in the first category and two subsets of the group are associated with state transitions from a present state to next states in the second category.

12. The invention of claim 11 further comprising the step of:

differentially encoding, prior to trellis encoding, selected ones of the first portion of the input bits.

13. The invention of claim 11 wherein the rate-4/5 trellis encoder is a finite state machine having 64 states.

14. The invention of claim 12 wherein the rate-4/5 trellis encoder is invariant to 90, 180, and 270 degree rotations of the constellation.

15. Receiver apparatus for processing a received signal that was generated by: applying first predetermined bits of an input data stream to a 4-dimensional (4D) rate-4/5 trellis encoder constructed such that, for each 4D signaling interval, transitions from a present state to a next state to provide a stream of trellis encoded bits, the trellis encoder occupying one of a plurality of states, the plurality of 8 states being: divided into first and second categories, and from each present state, half of the transitions will lead to next states in the first category and half of the transitions will lead to next states in the second category; selecting, in response to the trellis encoded bits, one of a plurality of subsets of the 4D constellation, the plurality of subsets forming first and second families of subsets, each family of subsets being evenly divided into a plurality of groups of subsets having four subsets in each group, the subsets within each group being obtainable from each other through 90 degree phase rotations, and the subsets that are associated with state transitions from present states in the first category belong to the first family and the subsets that are associated with state transitions from present states in the second category belong to the second family, for each group of subsets that is associated with state transitions from a present state, two subsets of the group are associated with state transitions from a present state to next states in the first category and two subsets of the group are associated with state transitions from a present state to next states in the second category; identifying, in response to a second portion of the input bits, a 4D signal point from the selected subset; and generating an output signal representing a valid sequence of successive identified 4D signal points, wherein a valid sequence of signal points becomes another valid sequence of signal points after a 90, 180, or 270 degree rotation; and by thereafter providing, in said generated signal, channel signal points selected from a predetermined 4D signal constellation in response to the stream of trellis encoded bits and second predetermined bits of the input bit stream, said receiver apparatus comprising:

means including a maximum-likelihood-type decoder for recovering from said received signal a) the first predetermined bits and b) the second predetermined bits; and means for recovering a valid sequence of successive channel signal points as another valid sequence of channel signal points after a 90, 180, or 270 degree rotation of the constellation.

16. The invention of claim 15 further comprising the step of:

differentially encoding, prior to trellis encoding, selected ones of the first portion of the input bits.

17. The invention of claim 15 wherein the rate-4/5 trellis encoder is a finite state machine having 64 states.

18. The invention of claim 17 wherein the rate-4/5 trellis encoder is invariant to 90, 180, and 270 degree rotations of the constellation.

19. Receiver apparatus for processing a received signal that was generated by applying, during each signaling interval, a first group of a sequence of input bits representing a selected sequence of signal points from a 4-dimensional (4D) QAM constellation to a 4D rate-4/5 trellis encoder to generate a plurality of trellis encoded bits, the constellation having four phase symmetries and a minimum square Euclidean distance (MSED) between its signal points of a first predetermined distance; selecting, in response to the trellis encoded bits, one of a plurality of subsets of the 4D QAM constellation; identifying, in response to a second group of the sequence of input bits, a 4D signal point from the selected subset; and generating an output signal representing a valid sequence of successive identified 4D signal points, the MSED between two valid sequences of signal points corresponding to any two different sequences of input bits is five times the first predetermined distance and a valid sequence of signal points becomes another valid sequence of signal points after a 90, 180, or 270 degree rotation, said receiver apparatus comprising:

means including a maximum-likelihood-type decoder for recovering from said received signal a) the first group of the sequence of input bits and b) the second group of the sequence of input bits; and means for recovering a valid sequence of successive channel signal points as another valid sequence of channel signal points after a 90, 180, or 270 degree rotation of the constellation.

* * * * *